F. O. BLACKWELL AND N. H. EMMONS, 2D.
METHOD OF AND APPARATUS FOR THE HEAT TREATMENT OF FINELY DIVIDED MATERIALS.
APPLICATION FILED APR. 12, 1918.
1,315,460.
Patented Sept. 9, 1919.
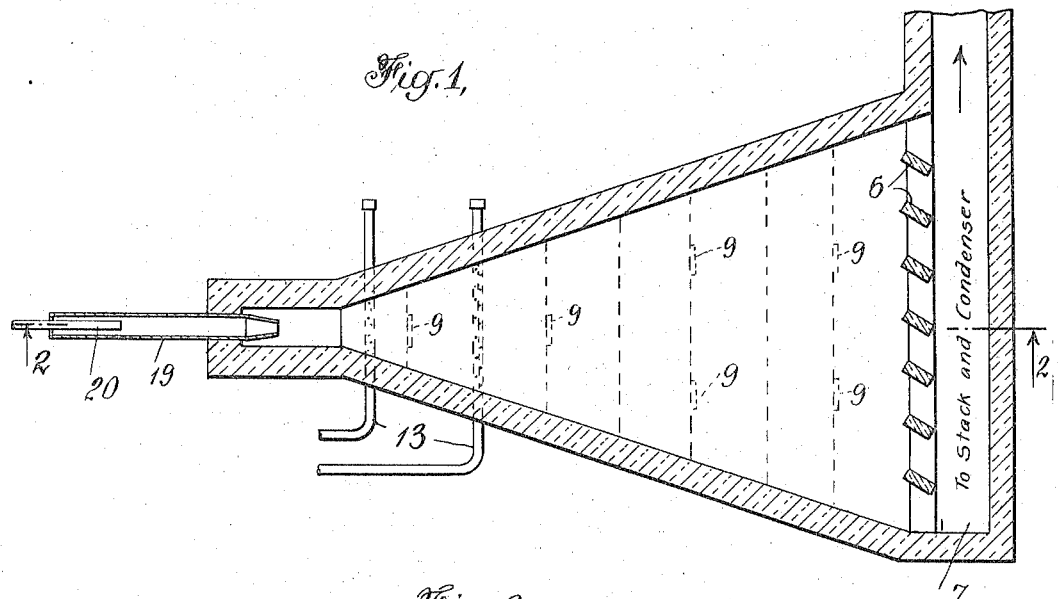
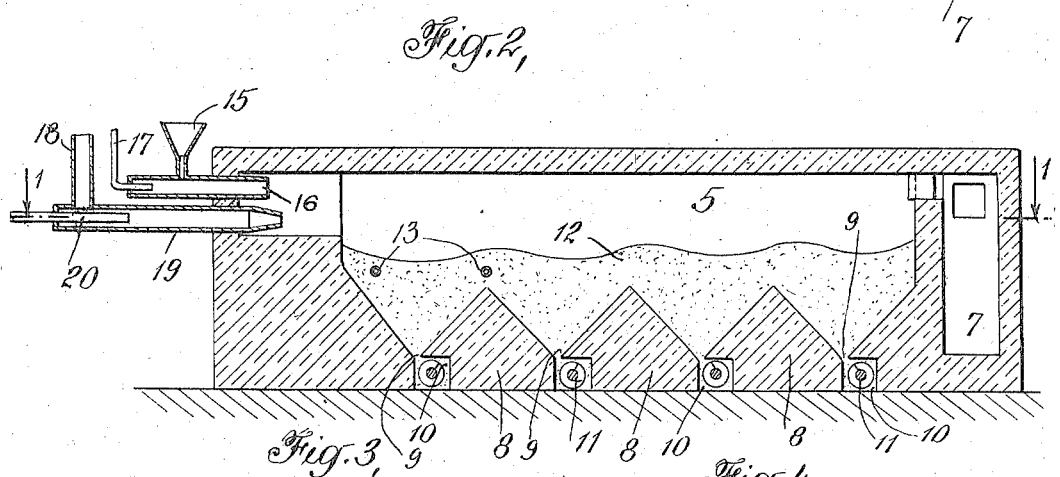
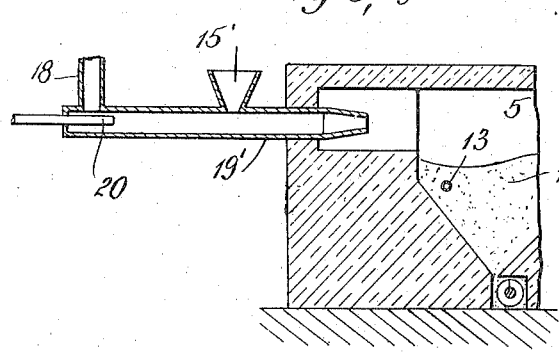
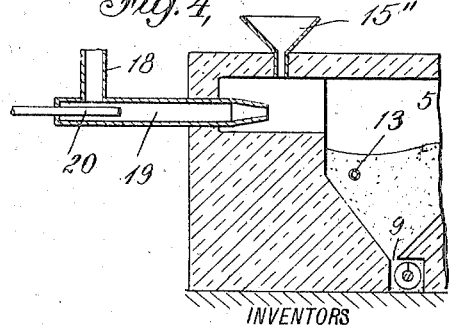
INVENTORS
Francis O. Blackwell
Nathaniel H. Emmons, 2d
BY
Pennie, Davis, Marvin and Edmonds
ATTORNEYS

UNITED STATES PATENT OFFICE.

FRANCIS O. BLACKWELL, OF ENGLEWOOD, NEW JERSEY, AND NATHANIEL H. EMMONS, 2D, OF NEW YORK, N. Y.

METHOD OF AND APPARATUS FOR THE HEAT TREATMENT OF FINELY-DIVIDED MATERIALS.

1,315,460.            Specification of Letters Patent.      Patented Sept. 9, 1919.

Application filed April 12, 1918. Serial No. 228,159.

*To all whom it may concern:*

Be it known that we, FRANCIS O. BLACKWELL, a citizen of the United States, residing at Englewood, county of Bergen, and State of New Jersey, and NATHANIEL H. EMMONS, 2d, a citizen of the United States, residing at New York, in the county and State of New York, have invented certain new and useful Improvements in Methods of and Apparatus for the Heat Treatment of Finely-Divided Materials; and we do hereby declare the following to be a full, clear, and exact description of the invention, such as will enable others skilled in the art to which it appertains to make and use the same.

The present invention relates to the heat treatment of finely divided materials for calcining, roasting, dissociating, chloridizing or otherwise converting them into desired ultimate products appropriate to the purpose for which they are intended.

It has heretofore been customary, in the heat treatment of such materials, in a roasting or reverberatory furnace, to feed the material into the furnace and there stir or rabble the same, either mechanically or by hand, so as to distribute the material evenly over the hearth and expose a fresh surface for the desired thermal or chemical reaction, and after the desired action has been completed to withdraw the material, in part or wholly, through some outlet or outlets at the ends of the furnace, or at the circumference or center, if a circular furnace, or through doors at the sides or ends of the furnace. In contradistinction to such prior customary methods of heat treatment of finely divided materials, the present invention contemplates, in its complete aspect, a method of treatment wherein the finely divided material is borne into the heating chamber or furnace in admixture with a body of products of combustion of burning fuel, so that the material to be treated receives heat both by direct contact or communication with the hot products of combustion of the fuel and by reverberation from the roof of the furnace. Furthermore, the conditions of operation of the method of the present invention involve the settling of the finely divided material upon a highly heated body of progressively accumulating spent material whose heat is contributed to the calcining and like operation, and finally the finely divided material, even after it has settled, receives continued heat due to the passage of the products of combustion over the exposed surface thereof. The conjoint action of these thermal effects serves to realize an extraordinarily complete calcining, roasting, or the like, of the charge, so that in spite of its finely divided state it is possible to withdraw it in a practically spent condition with respect to the purposes in view.

We will herein describe our improved method of heat-treating finely divided material as applied to the calcining of crystalline aluminum fluorid, although it will, of course, be understood that we do not intend thereby to limit ourselves to this particular application of the invention. In the United States patent to Charles A. Doremus, No. 1,110,675, patented September 15, 1914, there is described a method of obtaining crystalline aluminum fluorid from its solutions by heating the solution in a closed vessel or autoclave. By this method relatively fine crystals of aluminum fluorid are obtained, containing varying amounts of water of crystallization, depending upon the temperature and pressure to which the solution is subjected. Merely for the purpose of explanation, we will assume that the composition of the crystalline aluminum fluorid so obtained is represented by the formula $Al_2F_6.6H_2O$. When such crystalline aluminum fluorid is heated to a temperature of about 800° C. it is decomposed into anhydrous aluminum oxid (or alumina) and hydrofluoric acid gas. This decomposition of crystalline aluminum fluorid of a composition represented by the foregoing formula may be illustrated by the following equation:

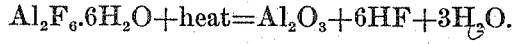

$$Al_2F_6.6H_2O + \text{heat} = Al_2O_3 + 6HF + 3H_2O.$$

The crystals of aluminum fluorid, as they are usually formed by the process described in the Doremus patent, are relatively small and fine, and considerable difficulty has heretofore been experienced in satisfactorily calcining the same. The methods and apparatus now in general use for calcining various substances have not been found practically applicable for calcining crystalline aluminum fluorid on a commercial scale. We have discovered that unless substantially every particle or crystal of the aluminum fluorid is directly exposed to the action of heat, the decomposition of the aluminum fluorid is incomplete and the resulting product will contain more or less aluminum fluorid mixed with the alumina. While this is not generally objectionable, as far as the alumina is concerned, it represents an actual loss of fluorin which cannot economically be permitted to occur in commercial practice. By the improved method of our present invention, a more complete and efficient decomposition of the crystalline aluminum fluorid is obtained with simple, inexpensive, and entirely practical apparatus, than has been possible by any method of calcining heretofore employed for this purpose with which we are acquainted.

In calcining crystalline aluminum fluorid in accordance with the method of our present invention, we inject the crystalline aluminum fluorid into a highly heated atmosphere in such a manner that substantially every particle or crystal of the material is exposed while in suspension to a sufficient degree of heat to effect its decomposition into alumina and hydrofluoric acid. A suitable injection of the crystalline aluminum fluorid can be conveniently effected by means of a compressed air blower, which will blow the crystalline material to be calcined into the highly heated atmosphere and will scatter and disperse it therethrough so as to individually expose substantially every particle of the material to the action of a sufficient degree of heat to effect its desired decomposition. Where a granular, pulverulent, liquid or gaseous fuel is employed, the crystalline aluminum fluorid may be advantageously injected into the combustion chamber together with the fuel, where it becomes widely scattered throughout the chamber and is subjected in transit to the flames and hot gases resulting from the combustion of the fuel. The combustion chamber or furnace into which the finely divided crystalline aluminum fluorid is injected or blown is of the reverberatory type so that the material not only receives heat as a result of its direct contact with the hot gases of the combustion chamber or furnace, but also receives heat by reverberation from the roof of the combustion chamber. We have found it advantageous to collect the resulting or spent alumina upon a bed or hearth of previously treated spent alumina where it continues to be exposed to the highly heated atmosphere until covered by similarly and subsequently formed alumina. By this method of heat treatment, the finely divided material is subjected to the calcining or heating action while in suspension in the combustion chamber and also after settling on the top surface of the hearth of which it in time forms a part.

As indicated by the foregoing formula, crystalline aluminum fluorid contains water of crystallization. Although the formula represents a composition in which each molecule of the crystalline aluminum fluorid contains six molecules of water, it will be understood by those skilled in the art that the molecule of crystalline aluminum fluorid may contain more or less than six molecules of water. Three molecules of water are necessary for the decomposition of one molecule of anhydrous aluminum fluorid into alumina and hydrofluoric acid, and, as indicated by the preceding equation, such water is furnished by the water of crystallization of the crystalline aluminum fluorid. By the introduction of the crystalline aluminum fluorid into the body of the combustion chamber where the flame is hottest, in accordance with our invention, the water of crystallization is immediately set free and heated to the required temperature to act on the anhydrous aluminum fluorid and effect the decomposition sought, that is, the chemical change from $Al_2F_6$ to $Al_2O_3$ and HF. Thus, the treatment of the crystalline aluminum fluorid, in accordance with our invention, may be considered as a two-stage process, in the first stage of which the crystalline aluminum fluorid is highly heated to drive off the water of crystallization and thereby producing an atmosphere of highly heated moisture, and in the second part of which the resulting dehydrated aluminum fluorid is subjected to the action of this resulting highly heated atmosphere of moisture to effect its decomposition into alumina and hydrofluoric acid. Thus, the water required in the second stage of the process for effecting the desired decomposition of the aluminum fluorid is injected into the combustion chamber by means of the crystalline aluminum fluorid, and is heated to the necessary reaction temperature by the first stage of the process in which the crystalline aluminum fluorid is freed of its water of crystallization.

Any suitable means may be provided for collecting the hydrofluoric acid gas resulting from the decomposition of the crystalline aluminum fluorid. The combustion chamber is preferably provided with a suitable exit flue for the combustion gases and the like, and the hydrofluoric acid passing out through this flue with the other spent gases may be recovered in a suitable condenser through which the gaseous products of combustion will pass unaltered. For example, the hydrofluoric acid may be condensed, in an ordinary lead-lined water cooled condenser, and subsequently reused in the treatment of clay, bauxite, or other alumina-containing materials for the preparation of aluminum fluorid solutions from which crystalline aluminum fluorid may be obtained as described in the aforementioned Doremus patent.

The features of the invention which we believe to be patentably characteristic thereof are indicated in the appended claims. The method of the invention, together with our improved apparatus for carrying out this method, will be better understood from the following description taken in conjunction with the accompanying drawings, in which:

Figure 1 is a plan in section diagrammatically illustrating a type of furnace embodying our present invention; Fig. 2 is an elevation in section of the furnace of Fig. 1; and Figs. 3 and 4 are modified arrangements for injecting the finely divided material to be calcined into the combustion chamber of the furnace.

The furnace illustrated in the accompanying drawings is of the reverberatory type and is made of fire brick or other suitable refractory material, and comprises a tapering combustion chamber 5 which is narrower at its entrance or feed end than at its exit end. This tapering configuration of the combustion chamber provides an increasingly larger space for the dispersion and scattering of the material to be calcined as such material passes from the entrance or feed end of the furnace through the combustion chamber and settles upon the hearth. In other words, the material in its passage through the combustion chamber is better enabled to disperse and scatter due to the progressively increasing cross-section of this chamber, and in this manner, a more complete and thorough exposure of the individual particles of the material to the action of the hot gases of the combustion chamber is effected.

Where the apparatus is to be employed for calcining crystalline aluminum fluorid, the furnace should be constructed of refractory material as free as possible from silica and silicious matter, since otherwise the hydrofluoric acid will attack the silica and dissolve the same. At its enlarged or wider end, the combustion chamber communicates with an exit flue from which the products of combustion and other gases are conducted to the stack or condenser. A plurality of inclined blocks or baffles 6 are arranged at the exit end of the combustion chamber, in order to slightly divert the outgoing gases in their passage to the exit flue. These inclined baffles 6 thereby assist in removing any entrained dust which the outgoing gases might be carrying along with them. The exit flue has a relatively deep well 7 in which such entrained dust as may be thus removed from the outgoing gases is collected.

The combustion chamber is provided with a bottom hearth-supporting member 8, which is shown in Fig. 2 of the drawings as of pyramidal shape. It will, of course, be understood that this hearth-supporting member may be of any suitable or desired configuration. The hearth-supporting member is provided with a plurality of openings 9 which communicate with transverse passages 10. The passages 10 may be provided with screw conveyers 11 for removing the material discharged therein through the openings 9. Other means may, of course, be employed for removing material from the passages 10, as for example, rakes, shovels, or the like. The hearth of the combustion chamber comprises a body 12 of material previously treated in the combustion chamber 5 and resting upon the hearth-supporting member 8. Pipes 13 are arranged within the hearth body 12 for stirring or agitating the same by the injection of steam or compressed air therein. These agitating pipes are preferably placed near the entrance or feed end of the combustion chamber since it is only at this end that it will generally be necessary to agitate the material of which the hearth body is composed. It will, of course, be understood that where it is unnecessary to stir or agitate the material of the hearth body, the pipes 13 may be omitted.

In the apparatus shown in the accompanying drawings, the finely divided material to be calcined, such as crystalline aluminum fluorid, is injected into the combustion chamber together with the fuel. Thus, in Figs. 1 and 2 of the drawings, the finely divided material to be treated drops through a suitable feed funnel 15 into a horizontal pipe 16 from which it is injected or blown into the combustion chamber by means of compressed air received from the compressed air pipe 17. The fuel is fed from a suitable reservoir through the feed pipe 18 into the discharge nozzle or burner 19 from which it is injected into the combustion chamber by means of the compressed air pipe 20. By this arrangement, the material to be calcined is injected into the combustion chamber above the fuel and must therefore fall through the flames and hot gases resulting from the combustion thereof before settling upon the top surface of the hearth 12.

In the modification illustrated in Fig. 3 of the drawings, the material to be calcined is fed directly into the fuel discharge nozzle 19' by means of the feed funnel 15.' The same air blast which serves to inject the fuel into the combustion chamber thus serves to inject the material to be calcined therein. In the arrangement illustrated in Fig. 4 of the drawings, the feed funnel 15" is arranged in the roof of the entrance passage at the feed end of the combustion chamber. As the material to be calcined drops from the feed funnel 15" into this entrance passage, it is blown into the combustion chamber by the fuel blast from the fuel discharge nozzle 19.

The mode of carrying out the method of our present invention in the apparatus illustrated in the accompanying drawings is as follows: The material to be calcined, such as crystalline aluminum fluorid, is injected into the combustion chamber of the apparatus along with the fuel. Due to the progressively increasing section of the combustion chamber and to the air blast by which the material to be calcined and fuel are injected therein, the material is widely scattered throughout the combustion chamber, and substantially every particle thereof is individually exposed to the action of the highly heated atmosphere thereof. In this manner the material is thoroughly and efficiently exposed to the requisite degree of heat to effect the desired reaction, and settles or falls upon the surface of the hearth 12. This hearth is composed of material similarly and previously treated and its proper depth may be maintained by withdrawing from the bottom thereof an amount of material substantially equivalent to that deposited on the top.

The finely divided material in its passage or transit through the combustion chamber is subjected while in suspension to a two-fold heat action, the first of which results from the direct contact of the material with the hot gases in the combustion chamber, and the second, results from the reverberation of heat from the roof of the chamber. The tapering configuration of the combustion chamber facilitates a wide dispersion or scattering of the finely divided material in its passage therethrough, so that substantially every particle of the material is individually exposed to this two-fold heat action before settling upon the hearth. Furthermore, the tapered configuration of the combustion chamber not only effects a wide dispersion of the finely divided material under treatment, but also serves to suitably regulate the draft through the combustion chamber, so as to insure a suspension of the finely divided material while in transit through the chamber for a sufficient length of time to effect an efficient exposure of the material to the heat actions. Thus, the draft at the entrance or restricted end of the combustion chamber is relatively great and sufficient to maintain the finely divided material of the charge in suspension as a result of its forward movement or impetus, while at the opposite or enlarged end of the combustion chamber the draft is so diminished that there is little or no tendency for the finely divided material to be carried out of the chamber thereby. Thus, between the two ends of the chamber, the draft progressively diminishes from the entrance end to the exit end for gaseous products, due to the progressively increased cross section of the chamber.

Ordinarily the normal draft through the combustion chamber resulting from the injection of the fuel and material to be treated, will be sufficient to carry away the products of combustion, and the hydrofluoric acid gas when calcining the crystalline aluminum fluorid. It will, of course, be understood that these gases may be withdrawn from the combustion chamber by a suitable vacuum or suction device, in case the natural draft of the furnace is not sufficient to effect this end.

In addition to the two-fold heat action which the material receives in its passage through the combustion chamber, it receives a further two-fold heat action after settling upon the hearth. In the first place, the surface of the hearth, composed as it is of material which has just been subjected in suspension to the heat influences of the combustion chamber, is very hot, and its heat is communicated to the new material settling thereon, and thus assists in the further calcining or heat treatment of such material. And in the second place, the material settling on the hearth receives continued heating as the result of the passage of the products of combustion and hot gases of the combustion chamber over the exposed surface thereof. The particles settling upon the hearth may thus be raised to a higher temperature than they attain during their passage through the combustion chamber. This is particularly true in the case of the coarser particles, which may, accordingly, rise in temperature after being deposited upon the surface of the hearth. Thus, by the dispersion of the material while in transit through the combustion chamber, combined with the four-fold heating action to which it is subjected, there results a most complete and thorough exposure of substantially every particle of the material to the desired heating effect, thus insuring a substantially complete and thorough heat treatment or calcining.

The action of the furnace shown in the drawings may be continuous, that is to say, the spent material may be continuously withdrawn from the bottom of the hearth body 12 at substantially the same rate that freshly calcined or treated material settles thereon, or spent material may be intermittently withdrawn from the bottom of the hearth at such intervals as is desired or necessary for the appropriate operation of the apparatus. Ordinarily, the hearth bed will be maintained of a substantially uniform depth by withdrawing from the bottom thereof, either continuously or at suitable intervals, an amount of spent material substantially equivalent to the amount of freshly treated material settling on the surface thereof.

What we claim is:

1. The method of exposing finely divided material to the action of heat which consists in injecting said material into an atmosphere of highly heated gases whereby substantially every particle of the material is exposed to said gases, permitting said material to settle upon a hearth of a material similarly and previously exposed to the action of said gases and there continuing its exposure in a solid state to the action of said gases until covered by material similarly and subsequently exposed to the action of said gases; substantially as described.

2. The method of heat treating finely divided material which consists in injecting said material into a furnace of the reverberatory type and subjecting said material while in suspension within said furnace to direct contact with highly heated gases and to the action of heat reverberated from the roof of said furnace, and permitting said material to settle upon a highly heated body of progressively accumulating spent material whose heat is contributed to the further calcining of said material and where the exposed surface of the material continues to be subjected in a solid state to the heat of the hot gases passing thereover; substantially as described.

3. The method of heat treating finely divided material which consists in injecting said material into a chamber of progressively increasing section, subjecting said material while in suspension in said chamber to the action of hot gases, and permitting said material to settle upon the bottom of said chamber and to be there subjected to the heat of similarly treated material which has just previously settled thereon and to the heat of the hot gases passing thereover; substantially as described.

4. The method of heat treating finely divided material which consists in injecting said material into a chamber of progressively increasing section so as to thoroughly scatter and disperse the material throughout the chamber and to progressively decrease the velocity of movement of the particles from the entrance end to the exit end of the chamber, subjecting said material while in suspension in said chamber to direct contact and communication with highly heated gases and to the action of heat reverberated from the roof of said chamber, and permitting said material to settle upon the bottom of said chamber and to be there subjected in a solid state to the heat of similarly treated material which has just previously settled thereon and to the heat of hot gases passing thereover; substantially as described.

5. The method of calcining finely divided material which consists in introducing said material into a furnace whose hearth is composed of previously calcined material and therein exposing the material while in suspension to highly heated gases, permitting said material after being exposed to said gases to settle upon said hearth, and maintaining the proper depth of said hearth as freshly calcined materials settles thereon by withdrawing a substantially equivalent amount of material from the bottom thereof; substantially as described.

6. The method of subjecting finely divided material to the action of heat which comprises injecting said material together with a suitable fuel into a reverberatory furnace having a hearth composed of previously treated material, exposing said material as it is injected into said furnace and while it is in transit to the flame and hot gases resulting from the combustion of said fuel, permitting said material to then settle upon and cover said hearth where it is further exposed to said flame and hot gases until it is itself covered by similarly and subsequently treated material, and maintaining the hearth of said furnace of the proper depth as fresh material falls thereon by withdrawing a substantially equivalent amount of material from the bottom thereof; substantially as described.

7. The method of calcining crystalline aluminum fluorid which consists in blowing the crystalline aluminum fluorid into a furnace of the reverberatory type and subjecting the aluminum fluorid while in suspension within said furnace to direct contact with highly heated gases and to the action of heat reverberated from the roof of said furnace, whereby the crystalline aluminum fluorid is decomposed into alumina and hydrofluoric acid gas, and permitting the spent material composed principally of alumina to fall upon a highly heated body of progressively accumulating alumina whose heat is contributed to the further calcining of material settling thereon and where the exposed surface of the material settling thereon continues to be subjected to the heat of the hot gases passing thereover; substantially as described.

8. The method of calcining crystalline aluminum fluorid which consists in blowing the crystalline aluminum fluorid together with a fuel, into a furnace of the reverberatory type having a combustion chamber of progressively increasing section whereby the aluminum fluorid is thoroughly scattered and dispersed throughout the chamber, subjecting the crystalline aluminum fluorid while in suspension within said combustion chamber to direct contact and communication with the hot gases resulting from the combustion of said fuel and to the action of heat reverberated from the roof of said combustion chamber, whereby the crystalline aluminum fluorid is decomposed into alumina and hydrofluoric acid gas, and permitting the spent material composed principally of alumina to settle upon a highly heated body of progressively accumulating alumina whose heat is contributed to the further calcining of material settling thereon and where the exposed surface of the material settling thereon continues to be subjected to the heat of the hot gases passing thereover; substantially as described.

9. The method of calcining crystalline aluminum fluorid which consists in injecting the aluminum fluorid into a heated atmosphere so that substantially every particle thereof is individually subjected to the action of a sufficient degree of heat to decompose the crystalline aluminum fluorid into alumina and hydrofluoric acid: substantially as described.

10. The method of calcining crystalline aluminum fluorid which consists in injecting the crystalline aluminum fluorid into a heated atmosphere and over a hot bed of alumina so that substantially every particle of the material is subjected to the action of a sufficient degree of heat to decompose the crystalline aluminum fluorid into alumina and hydrofluoric acid, and permitting the alumina so obtained to settle upon and form said bed of alumina; substantially as described.

11. The method of calcining crystalline aluminum fluorid which consists in exposing the aluminum fluorid to a highly heated atmosphere and thereby decomposing the crystalline aluminum fluorid into alumina and hydrofluoric acid, and permitting said alumina to settle upon a substantially horizontal bed where it continues to be exposed to a highly heated atmosphere until covered by similarly and subsequently formed alumina settling thereon; substantially as described.

12. The method of calcining crystalline aluminum fluorid which consists in blowing the crystalline aluminum fluorid into a highly heated atmosphere so as to expose substantially every particle thereof to the action of a sufficient degree of heat to decompose the crystalline aluminum fluorid into alumina and hydrofluoric acid, permitting the alumina so formed to settle upon a bed of alumina similarly and previously formed, and exposing the alumina so formed to the action of said highly heated atmosphere until covered by similarly and subsequently formed alumina; substantially as described.

13. The method of calcining crystalline aluminum fluorid which consists in simultaneously injecting crystalline aluminum fluorid and a combustible fuel into a furnace having a hearth of alumina and thereby exposing the crystalline aluminum fluorid as it is injected into the furnace and while it is in transit to the action of the flames and hot gases resulting from the combustion of said fuel, whereby said crystalline aluminum fluorid is decomposed into alumina and hydrofluoric acid, permitting said alumina to settle upon and cover said hearth of alumina while still being exposed to the action of said flames and hot gases and until itself covered by similarly and subsequently formed alumina, and maintaining said hearth of alumina of substantially uniform depth as fresh alumina is added to the top surface thereof by withdrawing a substantially equivalent amount of alumina from the bottom thereof; substantially as described.

14. The method of calcining crystalline aluminum fluorid which consists in subjecting the crystalline aluminum fluorid while suspended in air and in a finely divided condition to the action of highly heated gases whereby substantially every particle of the material is exposed to said gases and decomposed into alumina and hydrofluoric acid, permitting the alumina thus formed to settle upon a hearth composed of alumina similarly and previously formed and to be there further exposed to the action of said gases until covered by similarly and subsequently formed alumina; substantially as described.

15. An apparatus for calcining finely divided material comprising a hearth formed of material previously calcined in said apparatus, means for injecting fuel and the material to be calcined into said apparatus whereby said material is exposed to the flames and hot gases resulting from the combustion of said fuel and falls upon said hearth, and means for maintaining the proper depth of said hearth as freshly calcined material falls thereon by withdrawing a substantially equivalent amount of material from the bottom thereof; substantially as described.

16. An apparatus for calcining finely divided material comprising a combustion chamber having an exit flue and a hearth-supporting member provided with a plurality of discharge openings therein, a hearth supported by said member and composed principally of finely divided material previously calcined in said apparatus, means for injecting the material to be calcined into said apparatus so that after exposure to the hot gases in the combustion chamber it settles upon said hearth, and means whereby material may be withdrawn from the bottom of said hearth through the discharge openings therein; substantially as described.

17. An apparatus for calcining crystalline aluminum fluorid comprising a combustion chamber having an exit flue for gaseous products and a hearth-supporting member provided with a plurality of discharge openings, a hearth supported by said member and composed principally of alumina, means for injecting fuel and the crystalline aluminum fluorid to be calcined into said combustion chamber whereby the crystalline aluminum fluorid is exposed to the flames and hot gases resulting from the combustion of said fuel and is decomposed into hydrofluoric acid and alumina which latter settles upon said hearth, means for withdrawing said hydrofluoric acid from said combustion chamber, and means for withdrawing the alumina of said hearth through the discharge openings in said supporting member; substantially as described.

18. An apparatus for calcining crystalline aluminum fluorid comprising a combustion chamber having a hearth composed principally of finely divided alumina, means for heating said combustion chamber, means for injecting the crystalline aluminum fluorid to be calcined into said combustion chamber so that substantially every particle of the material is exposed to heat in transit and is decomposed into hydrofluoric acid and alumina which latter settles upon said hearth, means for withdrawing said hydrofluoric acid from said chamber, and means for withdrawing alumina from the bottom of said hearth.

19. The method of calcining crystalline aluminum fluorid which consists in exposing the crystalline aluminum fluorid in suspension to the action of highly heated gases and thereby driving off the water of crystallization and producing a highly heated atmosphere of moisture, subjecting the thus dehydrated aluminum fluorid to the action of said highly heated atmosphere of moisture and thereby effecting its decomposition into alumina and hydrofluoric acid, and permitting the so treated material to settle upon a bed of similarly and previously treated material and to be there subjected to said highly heated atmosphere of moisture until covered by similarly and subsequently treated material; substantially as described.

20. The method of calcining crystalline aluminum fluorid, which consists in exposing the crystalline aluminum fluorid in suspension to the action of highly heated gases and thereby driving off the water of crystallization and producing a highly heated atmosphere of moisture, and subjecting the thus dehydrated aluminum fluorid to the action of said highly heated atmosphere of moisture and thereby effecting its decomposition into alumina and hydrofluoric acid; substantially as described.

21. The method of calcining aluminum fluorid to effect its decomposition into alumina and hydrofluoric acid, which comprises injecting finely-divided crystalline aluminum fluorid into a combustion chamber and exposing the same while in suspension therein to the action of highly heated gases, thereby driving off the water of crystallization and producing a highly heated atmosphere of moisture, and subjecting aluminum fluorid to the action of said highly heated atmosphere of moisture; substantially as described.

22. In the calcining of aluminum fluorid, the method of producing a highly heated atmosphere of moisture for decomposing the aluminum fluorid into alumina and hydrofluoric acid, which comprises exposing finely-divided crystalline aluminum fluorid while in suspension to the action of highly heated gases and thereby driving off the water of crystallization and producing the desired highly heated atmosphere of moisture; substantially as described.

23. In processes of the character described, the method of producing a highly heated atmosphere of moisture for effecting chemical reactions, which comprises exposing a crystalline material containing water of crystallization and while in suspension to the action of highly heated gases and thereby driving off said water of crystallization and producing the desired highly heated atmosphere of moisture; substantially as described.

In testimony whereof we affix our signatures.

FRANCIS O. BLACKWELL.
NATHANIEL H. EMMONS, 2D.